US011451870B1

(12) United States Patent
Panchaksharaiah et al.

(10) Patent No.: US 11,451,870 B1
(45) Date of Patent: Sep. 20, 2022

(54) METHODS AND SYSTEMS TO DYNAMICALLY ADJUST A PLAYLIST BASED ON CUMULATIVE MOOD SCORE

(71) Applicant: Rovi Guides, Inc., San Jose, CA (US)

(72) Inventors: Vishwas Sharadanagar Panchaksharaiah, Tumkur District (IN); Vikram Makam Gupta, Karnataka (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/406,289

(22) Filed: Aug. 19, 2021

(51) Int. Cl.
*H04N 21/466* (2011.01)
*H04N 21/442* (2011.01)
*H04N 21/422* (2011.01)
*H04N 21/45* (2011.01)

(52) U.S. Cl.
CPC ... *H04N 21/4667* (2013.01); *H04N 21/42201* (2013.01); *H04N 21/44218* (2013.01); *H04N 21/4532* (2013.01)

(58) Field of Classification Search
None
See application file for complete search history.

(56) References Cited

U.S. PATENT DOCUMENTS

| | | | |
|---|---|---|---|
| 9,106,958 B2 * | 8/2015 | El Kaliouby | H04N 21/251 |
| 9,122,752 B2 * | 9/2015 | Bill | G11B 27/105 |
| 9,788,777 B1 * | 10/2017 | Knight | G10L 25/63 |
| 10,481,749 B1 * | 11/2019 | Alfishawi | A61B 5/11 |
| 2009/0182736 A1 * | 7/2009 | Ghatak | G06Q 30/02 707/999.005 |
| 2013/0080907 A1 * | 3/2013 | Skelton | H04N 21/4755 715/738 |
| 2014/0282237 A1 * | 9/2014 | Fuzell-Casey | G06Q 30/0601 715/810 |
| 2016/0004699 A1 * | 1/2016 | Liu | G06F 16/9535 707/734 |
| 2018/0349386 A1 * | 12/2018 | Circlaeys | G06F 16/48 |
| 2019/0174190 A1 * | 6/2019 | Newell | A61B 5/6803 |
| 2020/0168250 A1 * | 5/2020 | Vijil | H04N 21/854 |
| 2021/0266619 A1 | 8/2021 | Punja et al. | |
| 2021/0266637 A1 | 8/2021 | Punja et al. | |

* cited by examiner

*Primary Examiner* — Alexander Q Huerta
(74) *Attorney, Agent, or Firm* — Haley Guiliano LLP

(57) ABSTRACT

Systems and methods are described herein for recommending content based on a mood score associated with a user profile. The system accesses the viewing history of the user profile to determine media assets consumed and the mood score associated with each of the consumed media assets of the plurality of media assets. A cumulative mood score is calculated based at least in part to determine if the total score is below a mood threshold. Based on the cumulative mood score being lower than the mood threshold, the system generates for presentation, on the consumer device, one or more media assets with a positive mood score.

20 Claims, 10 Drawing Sheets

400

| User | Playlist sequence | Mood score | Cumulative mood score | Action |
|---|---|---|---|---|
| Media asset 1 | 1 | -75 | -75 | |
| Media asset 2 | 2 | -85 | -160 | |
| Media asset 3 | 3 | +20 | -140 | Increase mood |
| Boost mood media asset | 3 boost | +50 | -90 | |
| Media asset 4 | 4 | -60 | -150 | Increase mood |
| Boost mood media asset | 4 boost | +20 | | |

| User | Playlist sequence | Mood score | Cumulative mood score | Action |
|---|---|---|---|---|
| Media asset 1 | 1 | -75 | -75 | |
| Media asset 2 | 2 | -85 | -160 | Increase mood |
| Media asset 3 | 3 | +20 | -140 | |
| Boost mood media asset | 3 boost | +50 | -90 | |
| Media asset 4 | 4 | -60 | -150 | Increase mood |
| Boost mood media asset | 4 boost | +20 | | |

METHODS AND SYSTEMS TO DYNAMICALLY ADJUST A PLAYLIST BASED ON CUMULATIVE MOOD SCORE

BACKGROUND

The present disclosure relates to methods and systems for adjusting a playlist based on a mood score and, more particularly, to methods and systems for tracking a user profile's cumulative mood score and to dynamically adjust media assets for presentation on a consumer device based on the mood score.

SUMMARY

Many content items are shared and consumed on social networking platforms like Facebook, WhatsApp, Instagram, and YouTube. The content shared may leave a consumer of the content in a particular mood or feeling; for example, the consumer may be sad, happy or fearful, surprised, agitated, pensive, awed. The variety of subject material available makes it challenging to connect pieces of content. This is mainly because navigating content, particularly content segments such as video, is burdensome and lacks cohesiveness between the content and may inadvertently lead to a large number of items with a similar mood. Thus, after watching a number of such content items, a user may lose interest because the content has made them sad. For example, in the middle of a pandemic, there are a lot of content items (e.g., videos) related to the health crisis, death, illness, isolation, suffering, etc. The consumer may stream an online channel of short clips that follow one after another, in many circumstances. Each short clip is randomly selected and may focus on the health crisis. If a consumer watches many of such content items (e.g., videos) in one or more sessions, the consumer's mood may be impacted by the short clips that he or she has consumed. For example, consuming many short clips with negative, sad or depressing storylines may cause a lot of stress and unhappiness for the consumer.

In another circumstance, consumers share content with their friends on their social media platforms without considering the recipient's limits to being offended. For example, when a content item is shared on a social network, specific videos may be offensive and upset some consumers. There is no mechanism to flag such content based on the subject matter, offensiveness rating, or mood rating. Thus, there is a need for a system that transmits to the consumer device dynamically customizable playlists based on the recipient's mood, consumption pattern and viewing progress.

Content curation reflects various content segments in a media asset or multiple media assets to provide coherency and mood-driven content when assembled together to create a playlist. In one embodiment, the playlist is of media assets. Some examples of media assets include audio, video, text, augmented reality (AR), virtual reality (VR), etc. Content curation includes providing mood analysis of at least one content segment (e.g., mood score). A mood score contains information describing important characteristics of the content segment and may generally indicate the expected impact on the consumer's mood. Using mood analysis of the content segments (e.g., based on audio or video frames of the content), a curation system causes content to be curated based on analysis of the segment mood scores using a machine learning model. For example, a user associated with a user profile may wish to see a mix of content with a cumulative mood score above a threshold. In another example, a user profile may be consuming content on a user device, and the system may adjust the playlist to maintain the mood score of the user profile above a certain threshold.

A variety of video scenes may be available online. Some known happy video frames may be inserted into the playlist that follows a narrative structure in a defined order, e.g., a sad scene, a conflict scene, a relaxing scene, a resolution scene and a happy scene. Segment mood scores of video segments available online are compared with mood scores of the other video scenes (e.g., embodied in one or more machine learning models) to create a video playlist based on maintaining a cumulative mood score for the consumer. It will be understood that the foregoing playlist example is merely illustrative, and other types of playlist content can be curated in accordance with the present disclosure, such as, for example, music, books, magazines, newspapers, and blogs, which follow narrative structures to maintain a cumulative mood score for the consumer. For example, a user associated with a user profile may enter a mood score that the playlist of media assets should not cross. In some examples, the user wants to maintain a positive mood and instructs the system to curate the playlist to alternate positive or happy content between negative or sad content. Based on this disclosure, the system may eliminate or redistribute negatively scored contents in a playlist so that every content item is consumed in a controlled manner.

In some embodiments, methods and systems are disclosed for recommending content based on a mood score associated with a user profile. The system may access, from a memory database, a viewing history on a consumer device associated with a user profile. The viewing history may include a plurality of media assets presented on the consumer device and a mood score associated with each media asset. For example, as the consumer device presents a media asset, e.g., a short video from TikTok, the system tracks a mood score for the media asset. The mood score may be user inputted. The values that may be inputted as the mood score may vary from a positive value to a negative value, for example, a numerical value from −100 to 100. In such mood score values, a 0 would represent a neutral mood score, positive numbers would represent a happy mood score and negative number would represent a sad mood score. Other means of generating a mood score may be employed, for example, with a range from 0 to 10, or one star to five stars, with the score being more positive with more stars. In another embodiments the mood score may be generated based on analysis of the audio, video, context, other consumers' feedback or a combination thereof. The mood score can be added by analyzing user profile reactions to the media asset after being consumed. User profile reactions are usually captured in emojis, comments, and a smartwatch/band response. In some embodiments, the user profile may enter a mood score. For example, initially, the mood score is captured from different user profiles when the content is consumed, and it will take some time to gather such mood scores from several user profiles with varying profiles of user profiles before the system can calculate the average the mood score. In some embodiments, a negative mood score may be desirable. In another embodiments, a mood score at zero or near zero may be desirable. After generating a calculate the average mood score, the system can apply machine learning classifier algorithms to determine the mood score for a new user profile. In some embodiments, the system can determine the mood score for a media asset from −100 to +100. In such a data structure, a negative mood score implies how much negativity this content will bring to a user if they consume it.

Using a control circuitry, the system calculates a cumulative mood score for the user based on at least in part by the mood score for each media asset of the plurality of media assets in the viewing history. In some embodiments, the cumulative mood score is calculated by adding subtracting, multiplying, or dividing or a combination thereof. In some embodiments, the cumulative mood score may need to be adjusted lower, higher, positive or negative, and in response, cause the media assets recommended for the playlist that matched the desired goal of a based on at least one of lower, higher, positive or negative cumulative mood scores. In some embodiments, the cumulative mood score is based on the content consumed that day or in a viewing session or any other predetermined timeline. Using a control circuitry, the system may determine that the cumulative mood score for the user profile is lower than a mood threshold. For example, a mood threshold may be a predetermined value (e.g., −200 value, negative 200) set by the consumer, or a default value may be used. Based on the cumulative mood score being lower than the mood threshold, the system generates for presentation, on a consumer device associated with the user profile, media assets with a positive mood score. The system can apply the dynamic adjustment of the number of negative mood scores that can be watched in a single session or day. For example, the system can set −300 as the total amount of cumulative negative score consumed per watching session. In some embodiments, the curation engine can use this mood score to alter recommendations so that more positive media assets are recommended when the user profile is watching too many negatively scored media assets. In yet another embodiment, the system may receive a parental control input to limit the children to a certain mood score value. For example, a guardian can set a max negative score that a child can consume in a session. In response, the system may be configured to apply a filter based on mood score for each media asset, e.g., any content with a negative score of −50 or less should be automatically moved to the recycle bin. In another example, any content with a negative score of −50 or less may be replaced with another media asset with a mood score greater than −50, or supplemental content, such as an advertisement, with a positive mood score.

In some embodiments, calculating the cumulative mood score for the user profile includes capturing, via a sensor device, biometric data for the user associated with the user profile. The control circuitry correlates the biometric data to a biometric mood score based on the captured biometric data. The system then combines the biometric mood score and the mood score for each media asset of the plurality of media assets in the viewing history to determine the cumulative mood score of the user profile.

In some embodiments, the system further forwards, to a consumer device associated with the user profile, a media asset with a mood score below the mood threshold. For example, when user A wants to forward media content to user B, the system can analyze user B's profile, determine the mood score for this content and display this score before forwarding it to user B. This will help user A to decide whether to forward or not, for example, to avoid forwarding content that is perceived as negative or not desirable. In another example, when the user profile sends a media asset to a group (e.g., WhatsApp group), the system may analyze the mood score for each user of the group and can display a combined mood score or individual scores to display overall positivity or negativity. That is, when a score is negative, that media asset would result in the negative factor on all members by multiplying the mood score by each user profile in the group. In response to the overall positivity or negativity being greater than an overall factor threshold, the system may delay or recommend not to forward the media asset. In some embodiments, the system can also curb/delay the amount of negativity a user profile on a particular social platform can spread. For example, a user profile may forward a piece of news with a negative mood score of −10 to a group of 20 people. Based on the group size, the negativity spread will be −10*20 (people)=spread of a −200 negative mood score. If the system has a negative spread limit of −150, then such a forward is blocked. In some embodiments, such a negative spread may be limited to only select appropriate members. In some embodiments, the negative spread may be limited to randomly selected members of the group. In some embodiments, the system may exclude user profiles of the group who have already exceeded their cumulative mood scores. In some embodiments, the system may not send the media asset to some user profiles to be within the limit of −150. In yet another embodiment, the system may determine based on consumption score for the session/day which user profiles the message should not reach.

The system then determines that the cumulative mood score of the user profile is below the mood threshold. In response to determining that the cumulative mood score of the user profile is below the mood threshold, the system delays delivery of the media content with the mood score below the mood threshold to the consumer device associated with the user profile to avoid further lowering the mood of the user profile. In some embodiments, the system can also display the amount of positive and negative scores of the media assets the user profile has consumed (e.g., watched, listened to) and also how much positivity and negativity based on the mood score (e.g., mood score) he has spread.

In some embodiments, the system delays the delivery of the media content with the mood score below the mood threshold to the consumer device associated with the user profile until the cumulative mood score of the user profile is above the mood threshold.

In some embodiments, the system calculates the cumulative mood score for a user profile based on a predetermined period. In some embodiments, the system calculates the cumulative mood score for a user profile based on the latest content presentation session.

In some embodiments, the mood threshold is a first mood threshold. In some embodiments, the system generates for presentation, on the consumer device associated with the user profile, media assets with positive mood scores by generating for presentation media assets with mood scores above a second mood threshold. In some embodiments, the second mood threshold is higher than the first mood threshold.

In some embodiments, the system generates for presentation, on the consumer device associated with the user profile, media assets with positive mood scores by identifying a common context of the media assets presented for consumption based on the viewing history of the user profile. Based on identifying the common context of the media assets, the system generates for presentation, on the consumer device, media assets with positive mood scores and a context different from the identified common context.

In some embodiments, the mood threshold is a first mood threshold. In some embodiments, based on calculating the cumulative mood score, the system further compares the cumulative mood score to a second mood threshold. In some embodiments, based on the cumulative mood score being above the second mood threshold, the system recommends supplemental media assets for presentation on the consumer device.

In some embodiments, a trained media asset machine learning model includes a neural network and together, they form a generative adversarial network (GAN). The GAN includes a discriminator module (e.g., the content machine learning model) that compares a generated candidate playlist with authentic, approved, and/or previously distributed playlists. Suppose the discriminator fails to "pass," "approve," or "accept" the candidate playlist. In that case, factors pertaining to the failure may be fed back into the segment machine learning models to improve or modify the candidate playlist to more closely represent an approved or authentic playlist based on a mood score for each of the media assets in the playlist. For example, the discriminator module may determine if the content item included in the candidate playlist maintain the cumulative mood score for the consumer naturally. In addition, the discriminator module itself may also be reprogrammed and/or modified via a feedback loop. In some embodiments, both the segment machine learning models and the discriminator module may be fine-tuned in parallel.

In some embodiments of the present disclosure, the system analyzes the entire content of the candidate playlist using a content machine learning model to determine whether the content mood score of the entire playlist matches with the preferred cumulative mood score for the consumer. In some embodiments, when there is a match, the system validated the playlist. In some embodiments, the system distributes the validated playlist to the user profile. In some embodiments, the system updates the segment machine learning models and the content machine learning model based on the validated playlist.

In some embodiments, the system further includes receiving, at the consumer device, a selection of mood indicators of the media asset. The mood indicators may include at least one of an emoji, a comment, a mood input value or biometric data. The system may correlate, by the control circuitry, the mood indicators to a mood score for each media asset.

It should be noted that the systems, methods, apparatuses, and/or aspects described above may be applied to or used in accordance with other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 4 shows an example database of collected mood scores for a user profile based on viewing history, in accordance with some embodiments of the disclosure;

DETAILED DESCRIPTION

As referred to herein, the term "mood score" refers to mood analysis of characteristics corresponding to at least one frame/segment of content. In one embodiment, content is media content. Some examples of media content include audio, video, text, AR, VR, etc. A mood score represents information describing important characteristics of the content. As referred to herein, in some embodiments, a mood score is generated based on frames of the content segment. In some embodiments, the segment mood score is generated based on the entire content or a segment of content. In one embodiment, a mood score represents characteristics associated with one or more audio segments or tracks of content. In one example, a mood score may include mood analysis of a frequency range of the audio, such as background noise, foreground noise, volume of voice of a character, pitch of the voice, etc., in an audio track of the content. For example, when the content is of a beach scene, waves of the ocean make a sound that has certain characteristics that can be identified using mood score analysis. As another example, a mood score analysis may include natural language processing of audio of text. In one embodiment, a mood score represents characteristics associated with one or more video frames of the content. Such characteristics include texture, intensity (light), background color, weather character information (type or number), image recognition of characters, temporal data, etc., corresponding to at least one frame of a video. For example, facial recognition of characters may determine that one of the characters is an adult white male while another is a child (e.g., boy or a girl). As referred to herein, the terms "media asset" and "content" should be understood to mean any electronically consumable user asset, such as television programming, as well as pay-per-view programs, on-demand programs, Internet content (e.g., streaming content, downloadable content, or Webcasts), video, audio, playlists, electronic books, social media, applications, games, any other media, or any combination thereof. Content may be recorded, played, displayed, or accessed by devices. As referred to herein, "content providers" are digital repositories, conduits, or both of content items. Content providers may include cable sources, over-the-top content providers, or other sources of content. As referred to herein, the term "content curation" refers to content curated using mood score analysis.

Figure 1:
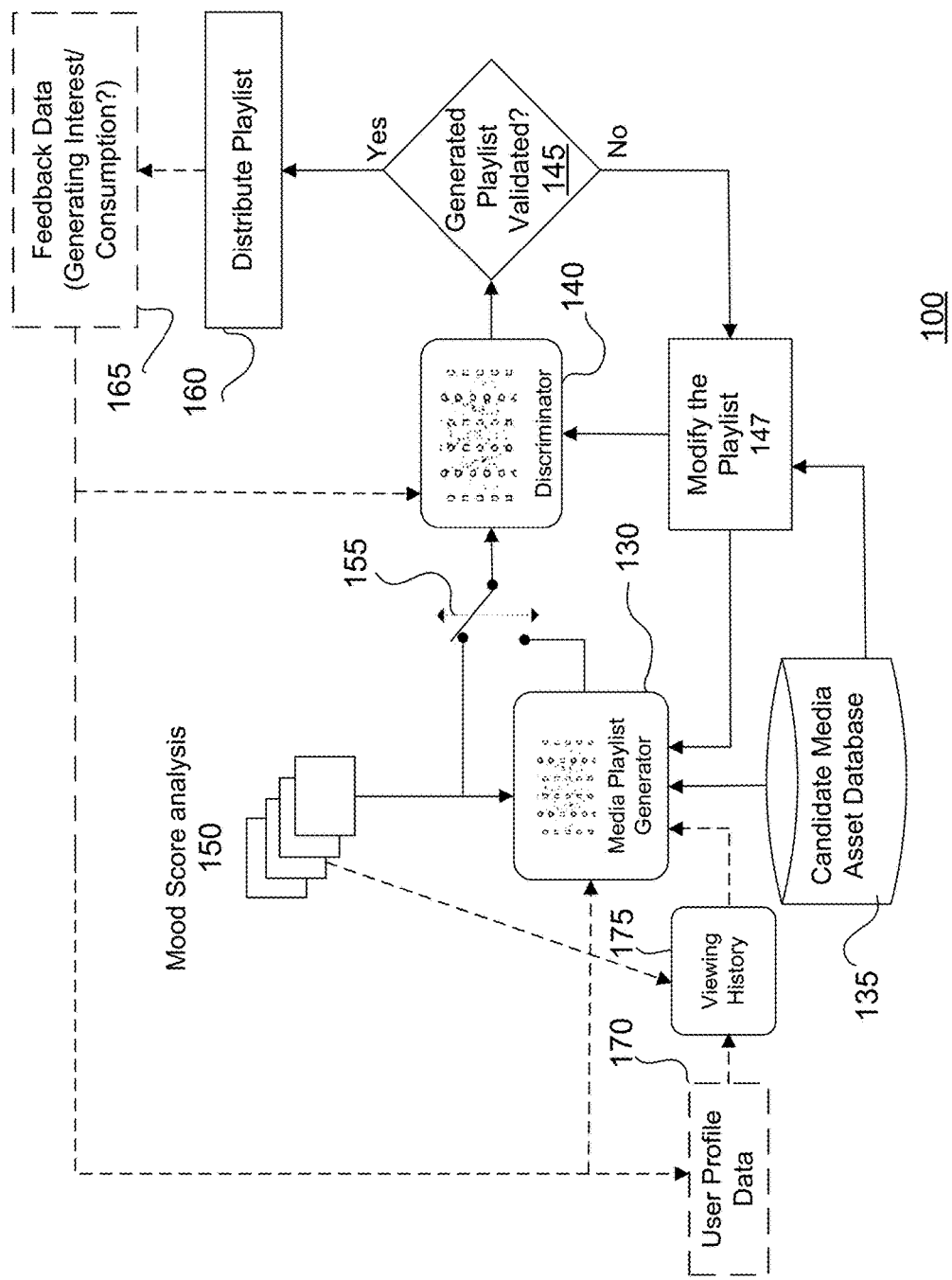
FIG. 1 shows an illustrative flowchart of a system 100 for curating media assets based on mood score associated with the media asset, according to some embodiments of the disclosure.

FIG. 1 shows an illustrative flowchart of a system 100 for curating media assets based on the mood score associated with the media asset according to some embodiments of the disclosure. In one embodiment, system 100 is a generative adversarial neural network (GAN) machine learning system for generating curated content. In one embodiment, content is media content. Some examples of media content include audio, video, text, AR, VR, etc. In one embodiment, a video playlist generator 130 retrieves media assets from a candidate media asset database 135. In one embodiment, the candidate media assets are retrieved via a local network. In one embodiment, the candidate media assets are retrieved via a communications network (e.g., communication network 604 of FIG. 6). The candidate media asset database 135 may include multiple various candidate media assets that include, for example, short content segments. In one embodiment, the media assets may include content that does not follow a structure. For example, the video segments may include short segments or segments extracted from or derived from a variety of content items. Thus, the candidate media assets may lack consistency between them when they are not curated to follow a structure. The playlist generator 130 uses segment machine learning models (see FIG. 3) to identify candidate media assets in database 135 that match the mood score of a cumulative mood threshold. The playlist generator 130 assembles the identified candidate media assets in the order of the mood score structure to generate a playlist of the identified candidate media assets that will not cause the mood associated with the user profile to drop below a mood threshold. In one embodiment, playlist generator 130 includes multiple versions of media assets machine learning models for different types of mood score structures (e.g., with more sad media assets, more exciting media assets, more happy media assets, etc.).

In one embodiment, the playlist generator 130 may use user profile data 170 to determine a particular mood score associated with a user profile's recently consumed content. For example, playlist generator 130 can compare viewing history 175 provided in user profile data 170 (e.g., content browsing history, prior content consumption, social media patterns, etc.) to the candidate segment database 135, mood score analysis 150, or the versions of media asset machine learning models to determine a cumulative mood score associated with a user profile for content already consumed and a preference for particular mood thresholds or characteristics of the media assets. In one example, the user profile data 170 may include one or more preferences for different mood scores for different content. User profile data 170 may also include predetermined profile preferences. Using the predetermined user profile preference(s) and candidate media assets as input, the playlist generator 130 may operate to generate a playlist of the identified candidate media assets of interest to the user, which permits the cumulative mood score of the user to remain at or above the mood threshold. In one embodiment, the user inputs the user profile preference(s) to the content generator 130. In one embodiment, the playlist generator 130 retrieves the user profile preference(s) from the user profile data 170 including the viewing history 175. For example, the playlist generator 130 may retrieve the length of time of content that a user desires from the user profile data 170 and identify/process media assets such that when assembled together, they fit into a length of time desired by the user while maintaining the cumulative mood score of the user at or above the mood threshold.

In one embodiment, the playlist generator 130 is a machine learning model programmed to determine and generate content based upon candidate segments in the database 135, feedback data 165 and the user profile data 170. Some examples of the machine learning models are decision tree learning, AdaBoost, linear regression, logistic regression, multivariate adaptive regression, locally weighted learning, Bayesian, Gaussian, Bayes, neural network, generative adversarial network (GAN), and/or other models known to those of ordinary skill in the art. Multiple models may be used with results combined, weighted, and/or otherwise compared in order to generate content.

As the playlist is generated, a comparison may be made between the generated playlist and the mood score associated with the media asset scheduled in the playlist and already-consumed media assets in the viewing history and the mood score analysis 150 at 155 to validate the playlist. In one embodiment, the comparison is performed by a discriminator 140. In one embodiment, the discriminator 140 applies a content machine learning model (see FIG. 3) to validate the playlist. The playlist is validated to assure, for example, that the assembled media assets of the identified candidate playlist have mood score consistency throughout the playlist to maintain the mood score (e.g., cumulative mood score) associated with the user profile above a mood threshold. The discriminator 140 may apply analysis (e.g., mood score analysis 150) and comparisons to determine if the generated playlist satisfies particular criteria pertaining to authentic/approved content/segments. Analysis/comparisons may include, for example, determining whether segments/content of the generated playlist sufficiently resemble the content or characteristics of the model content (e.g., as embodied in a content machine learning model). Various image processing functions (e.g., facial/object recognition, pattern matching, audio matching, etc.) may be employed to perform the analysis/comparisons.

In one embodiment, the discriminator 140 is a machine learning model programmed to discriminate between mood scores above a mood threshold (in some embodiments, the mood score is positive) and those that failed discrimination by having a mood score below a threshold or by the cumulative mood score of the user profile already being below the mood threshold. Some examples of the machine learning models are decision tree learning, AdaBoost, linear regression, logistic regression, multivariate adaptive regression, locally weighted learning, Bayesian, Gaussian, Bayes, neural network, generative adversarial network (GAN), and/or other models known to those of ordinary skill in the art. Multiple models may be used with results combined, weighted, and/or otherwise compared in order to determine whether a generated media asset playlist is validated or not. In one embodiment, the media playlist generator 130 and the discriminator 140 are trained in conjunction to function together as the GAN machine learning system.

Based upon the analysis/comparisons, a determination is made about whether the generated playlist is validated by having a cumulative mood score above a mood threshold at decision block 145. In one embodiment, if at decision block 145 it is determined that the playlist is validated, then the playlist is generated for presentation. In one embodiment, if at decision block 145 it is determined that the playlist is validated, then the playlist is distributed at block 160. A user may provide feedback on the distributed playlist. Feedback data 165 may include data indicating mood characteristics (of the frame or segment of the media content, e.g., text, audio, video, AR/VR) that should be introduced, removed, and/or modified in the generation of the playlist. Feedback data pertaining to the distribution of the playlist and related content consumption may be collected and received by the mood score analysis 150 to update mood characteristics of the media asset in the mood score and also used to store in and/or update the user profile data 170.

Feedback data regarding the mood indicators of the media asset may be received by the playlist generator 130 and the discriminator 140. Feedback data may include, for example, emoji, comments, a mood input value or biometric data associated with particular identified media asset or characteristics within the media asset. Feedback data may include data indicating attributes that should be introduced, removed, and/or modified in the mood curation. For example, feedback data may indicate a greater relative positive or negative response (e.g., consumption of content) from particular profile types to particular image/content structure attributes. The neural network may thus be reprogrammed to strengthen a connection (association) between a particular profile and content's positive or negative response. Based upon the feedback, playlist generator 130 may generate/modify content curation and again output the newly generated content for further processing by discriminator module 140. The cycle may continue until a satisfactory playlist is generated and/or a mood threshold of the user profile is maintained or exceeded.

After transmission of the feedback data to the mood score analysis 150, feedback data may be collected at loop 155 in connection with the transmission. Data reflecting consumption of the content (e.g., consumption in response to or proximate to the display of the content curation) may be collected and transmitted back to playlist generator 130 or discriminator module 140 and result in reprogramming or training of the generator 130/discriminator 140, such as based upon analysis of the generated content, related content consumption, and profile data. For example, a Tivo Edge™ device may be programmed to store records of consumption of the content before and immediately after the generated content curation and also consumption of the content in response to other content curation and/or consumption of content absent a proximate display of any content curation.

Returning back to decision block 145, if it is determined that the playlist is not validated, then, in one embodiment, the playlist is modified at block 147. In one embodiment, the system 100 identifies one or more media assets of the playlist that caused the mood score of the media asset to drop below the mood threshold. The system then retrieves one or more new media assets from the database 135 (e.g., using playlist generator 130 to identify another match) and replaces the identified one or more media assets with a negative response with the one or more new media assets with a positive response. The process is repeated by the discriminator 140 to validate the modified playlist including the one or more new media assets. In one embodiment, the process may continue to be repeated until a modified playlist is validated.

In some embodiments, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via the communications network. These cloud resources may include one or more content sources and one or more media guidance data sources. In addition or in the alternative, the remote computing sites may include other user equipment devices, such as user television equipment, user computer equipment, and wireless user communications devices. For example, the other user equipment devices may provide access to a stored copy of a video or a streamed video. In such embodiments, user equipment devices may operate in a peer-to-peer manner without communicating with a central server.

In some embodiments, a user equipment device may receive the media assets from other users and/or groups of users. In such a scenario, the user may receive, along with the media asset, a mood score associated with the media asset. As part of the media asset being received by a user equipment device (e.g., consumer device), the system may determine the cumulative mood score associated with each user of the user equipment device. Based on the determined cumulative mood score associated with the user, the system may determine that the cumulative mood score will drop below a mood threshold for the user consuming the media asset and, as a result, the system may delay delivery of the media asset to avoid dropping the mood score of the user below a threshold. In some embodiments, the system may insert a happy media asset into the playlist's presentation to boost the user profile's mood before delivering the received media asset. For example, before sending the sad video, the system may transmit a favorite music video.

In some embodiments, a system may monitor the cumulative mood score of each user profile to determine the most optimal time for inserting a commercial. Based on identifying a mood score that triggers user profile engagement and a level of happiness, the system may insert supplemental content, such as an advertisement, instead of inserting a random media asset. The mood score that triggers user profile engagement and a level of happiness may be a preset value or may be unique for each user profile.

In some embodiments, a system may transmit the media asset to other user profiles and/or groups of users. In such a scenario, the user profile may transmit a mood score associated with the media asset. As part of the media asset being transmitted by the user equipment device (e.g., consumer device), the system may determine the cumulative mood score associated with each user of the group. Based on the determined cumulative mood score associated with each user, the system may determine that the cumulative mood score will drop below a mood threshold for the user profile if the media asset is consumed and may delay delivery of the media asset. In some embodiments, the system may insert positive media assets into the presentation of the playlist to boost the mood of the user before delivering the received media asset. In some embodiments, the system may insert a media asset that is calming (e.g., meditation session) into the playlist of the presentation.

In some embodiments, the system determines a level of privacy based on the other user profiles in the group and a set of rules. The system may determine the level of privacy based on whether any of the other user profiles in the group are below an age threshold or friends on a social network or have some other relationship. For example, if children are in the area, a high level of privacy may be required in order to prevent inappropriate language, discussion of adult topics or negative responses. The system may determine the level of privacy as selected by the user associated with the user profile. In some embodiments, the system may determine the level of privacy based on whether the identities of each of the other users meet the set of rules.

In some embodiments, the system employs the mood score values for parental control features to limit or eliminate certain content from the children's playlist. For example, a parent may enter criteria to eliminate all negative media assets from the playlist and insert only positive media assets for the child. This may be irrespective of other parental restrictions. For example, a parent wants to limit negative content from a child's device and restricts the content to only positive content. In yet another embodiment, the parental restrictions may be time-limiting and provide rules/policies for the system to follow between certain hours of the day. For example, the parent may not want the child to watch any negative media assets before bedtime.

Figure 2:
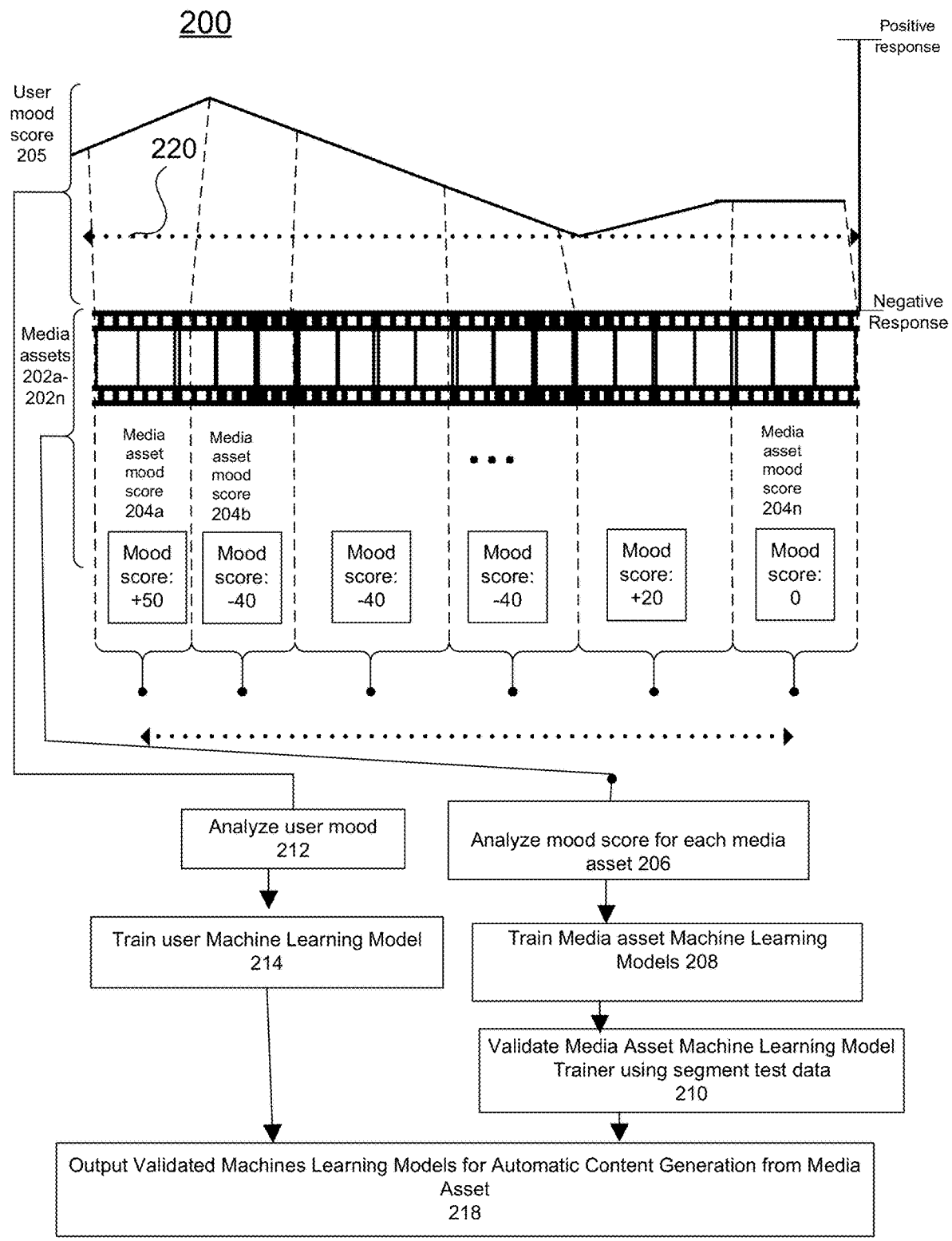
FIG. 2 depicts a flowchart of an illustrative process for training machine learning models for mood tracking associated with a user and generation of media assets based on the cumulative mood score, in accordance with some embodiments of the disclosure.

FIG. 2 depicts a flowchart of an illustrative process 200 for training machine learning models for automatic playlist generation from media assets. In one embodiment, process 200 is used to train the machine learning models used by playlist generator 130 and discriminator 140 of FIG. 1. As shown, media assets 202a-202n are input into the process. Some examples of media content include audio, video, text, AR, VR, etc. Each of media assets 202a-202n includes a media asset mood scores 204a-204n that is indicative of the mood response of the consumers. For example, mood scores 204a-204n of each of the media assets 202a-202n may correspond to a mood structure (e.g., alternative happy and sad videos, play only happy videos) that includes a plurality of mood scores having a balance of media assets with plurality of responses that inciting happiness, and sadness. Each of the media assets may be related to the next media asset and may provide an alternate viewpoint and, based on the mood score associated with the user profile, the user profile may be limited by the negative response that is triggered.

In one embodiment, at step 206, mood scores 204a-204n of individual media assets are analyzed to generate a combined mood scores. In one embodiment, at step 206, the mood scores 204a-204n are constantly updated based on rolling feedback from the user and other consumers to generate media asset mood scores. In one embodiment, all of the media assets 202a-n are analyzed to generate mood scores that are then further processed. Then each of the remaining media assets 202a-n are analyzed to generate additional sets of mood scores. Each set of mood scores corresponds to a different media asset as feedback is received. For example, the mood score for a media asset represents characteristics associated with one or more video frames of content segments. Such characteristics includes texture, intensity (light or audio), background color, weather, noise (background, foreground, etc.), character information (type or number), image recognition of characters, or temporal data corresponding to at least one frame of a video. Mood score components relate to characteristics such as range of texture values, light intensity values, shape intensity values, audio frequency values, etc., and changes over time to those values. In one embodiment, the mood score is generated using mathematical operations performed on one or more frames of the media assets 202a-202n. For one illustrative example, a cumulative mood score component corresponds to light intensity. In one embodiment of this example, the mood score component corresponding to light intensity comprises the real-time values of light intensity of each pixel in each frame of a segment. In another embodiment of this example, the mood score corresponding to light intensity includes an average light intensity of each frame of the segment. In another embodiment of this example, the mood score corresponding to light intensity includes an average light intensity across multiple frames (e.g., over 1-second intervals) of the media asset. In another embodiment of this example, the mood score corresponding to a media asset may include a negative context in parts of or across the entire media asset.

In one embodiment, at step 208, the process 200 trains a plurality of media asset machine learning models using the mood score generated at step 206 to output trained media asset machine learning models. The machine learning models are trained to identify known mood scores for media assets to be inserted into the playlist to maintain a cumulative mood score above a threshold. In one embodiment, mood scores of sad media assets are also used to train the media asset machine learning models to better enable the models to differentiate between happy media assets and sad media assets. For example, the happy media assets may be inserted throughout the playlist, and the sad media asset may be inserted only when the cumulative mood score is above a mood threshold. In some embodiments, training the media asset machine learning models includes iteratively determining weights for a neural network while minimizing a loss function to optimize the weights. In some embodiments, media asset machine learning models include a neural network, a Bayesian network, any suitable computational characterization model, or any combination thereof. Systems and methods for training media asset machine learning models are discussed in greater detail in connection with U.S. Provisional Patent Application No. 62/979,785 filed Feb. 21, 2020 and U.S. Provisional Patent Application No. 62/979,784 filed Feb. 21, 2020, both of which are hereby incorporated by reference herein in their entireties. In some embodiments, a media asset machine learning model output includes a value, a vector, a range of values, any suitable numeric representation for determining whether a content segment matches the model, or any suitable combination thereof.

The process 200 validates the trained media asset machine learning models using media asset test data at step 210. In one embodiment, the media asset test data includes mood score, and the test data is inputted to the trained media asset machine learning models to validate the models. For example, a model trained sufficiently well is expected to find a match when test data of mood score are inputted into the model. In one embodiment, the test data also includes mood score for sad media assets, which are not similar to the segments used to train the model. Accordingly, a well-trained model is expected to discriminate between happy mood scores and sad mood score of media assets based on the mood of the consumer. In some embodiments, the trained media asset machine learning models that have sufficient performance are outputted as validated media asset machine learning models at block 218. In one embodiment, the segment machine learning model is outputted via a local network. In another embodiment, the segment machine learning model is outputted via a communications network (e.g., communication network 604 of FIG. 6).

In one embodiment, at step 212, the user mood is analyzed to generate content mood score of the user profile consuming the content. The mood score represents characteristics associated with the entire content of the content items. Such characteristics includes texture, intensity (light or audio), background color, weather, noise (background, foreground, etc.), character information (type or number), image recognition of characters, temporal data corresponding to the entire content of the content item. Mood score components relate to characteristics such as range of texture values, light intensity values, shape intensity values, audio frequency values, etc., and changes over time to those values. In one embodiment, the mood scores are generated using mathematical operations performed on the entire content of each of the media assets 202a-202n. For one illustrative example, a mood score corresponds to a chart with the rolling mood of the consumer as extrapolated based on the amount of content consumed and the mood score associated with each of the media assets. For example, the user profile starts consuming the content at a mood level as determined based on the viewing history of content, and the mood fluctuates as more content is consumed.

In one embodiment, at step 214, the process 200 trains a user machine learning model using the mood scores generated at step 212 to output a trained user machine learning model. The user machine learning model is trained to identify known mood scores and track the mood score as the user profile consumes additional content. In one embodiment, the mood scores of different media assets are also used to train the user machine learning model to better enable the model to dynamically adjust the media assets on the playlist to maintain a mood score above a threshold level 220. In some embodiments, training the content machine learning model includes iteratively determining weights for a neural network while minimizing a loss function to optimize the weights. In some embodiments, content machine learning models include a neural network, a Bayesian network, any suitable computational characterization model, or any combination thereof. Systems and methods for training content machine learning models are discussed in greater detail in connection with U.S. Provisional Patent Application No. 62/979,785 filed Feb. 21, 2020 and U.S. Provisional Patent Application No. 62/979,784 filed Feb. 21, 2020, both of which are hereby incorporated by reference herein in their entireties. In some embodiments, a content machine learning model output includes a value, a vector, a range of values, any suitable numeric representation for determining content, or any suitable combination thereof.

Figure 3:
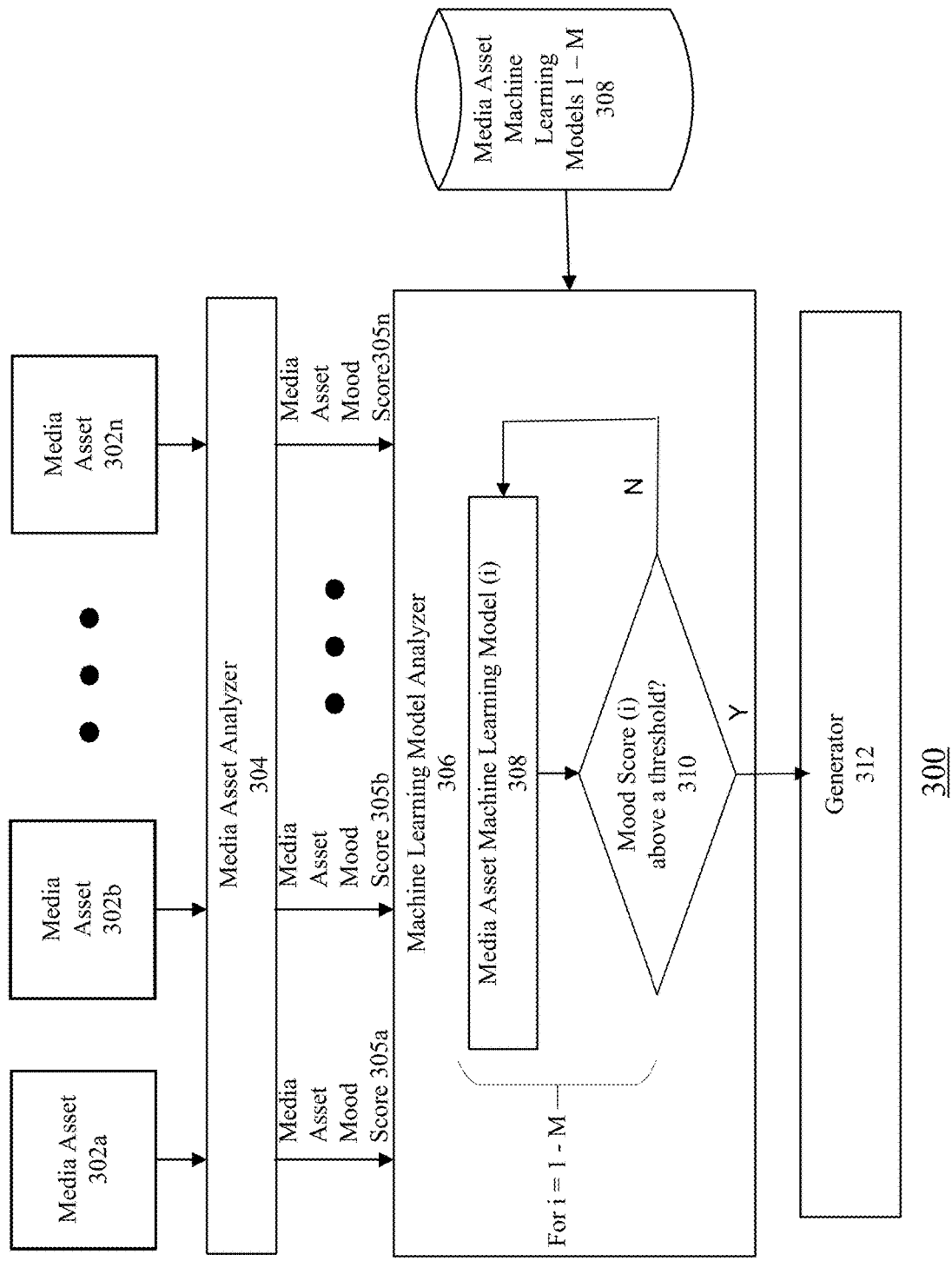
FIG. 3 is an illustration of a content curation system for generating a playlist of media assets based on mood score using a media asset machine learning model, in accordance with some embodiments of the disclosure.

FIG. 3 shows an illustrative flowchart of a system 300 (e.g., playlist generator 130 of FIG. 1) generating a playlist of content segments using segment machine learning models generated from, for example, the process 200 of FIG. 2. In one embodiment, content is media content. Some examples of media content include audio, video, text, AR, VR, etc. In one embodiment, a plurality of candidate media assets 302a-302n are each analyzed by a segment analyzer 304. The media assets analyzer 304 generates media asset mood scores 305a-305n corresponding to respective candidate segments 302a-302n based on the media asset of each of the candidate segments. As discussed above, the media assets, or components thereof, are generated based on characteristics corresponding with audio of the content, in one embodiment. Also, as discussed above, in some embodiments, the mood score is generated based on characteristics corresponding with video frames of the content. In one embodiment, each of the mood scores 305a-305n are analyzed by a machine learning model analyzer 306. In one embodiment, the machine learning model analyzer 306, for each media asset having a defined order, retrieves a segment machine learning model 308 among a plurality of media asset machine learning models 308a-308m. In one embodiment, the media asset machine learning model is retrieved via a local network. In another embodiment, the media asset machine learning model is retrieved via a communications network (e.g., communication network 604 of FIG. 6).

The machine learning model analyzer 306 further compares the mood scores 305a-305n for media assets 302a-302n with the mood scores corresponding to the media asset of each of the retrieved media asset machine learning models 308 (1-M) to determine if there is a match at block 310. In one example, the retrieved media asset machine learning models analyze the mood scores until a match is found for each model. If, at block 310, it is determined that a mood score does not match with the retrieved media asset machine learning model, then the machine learning model analyzer 306 repeats the process by analyzing the next mood score. If, for example, at block 310, it is determined that the mood score is above a threshold, then the machine learning model analyzer 306 identifies the candidate mood score 305 as a match. Then, a playlist of the candidate segments whose mood scores are identified as matches is generated by a generator 312.

FIG. 4 shows an example table of a database of a playlist including mood scores for a user profile based on viewing history, in accordance with some embodiments of the disclosure and table of a database 400 (e.g., discriminator 140) for validating a playlist (e.g., a playlist generated in FIG. 3) utilizing a content machine learning model (e.g., a content machine learning model trained in FIG. 2). The table includes information about users, playlist sequence, actions (activity), mood score for each media asset derived based on an algorithm and a cumulative mood score for the user profile based on the progression of the sequence, as illustrated in FIG. 1. The playlist includes a first media asset (e.g., story on Pandemic in India) that has a negative response −75 mood score. The playlist includes a second media asset (e.g., story on Pandemic in Europe) that has a negative response −85 mood score and the combined mood score of −160 by combining the first media asset and the second media asset. A third media asset is a scheduled media asset (e.g., meditation video) with a positive response of +20. That third response increases the mood of the user profile to −140. Since the next media asset that is scheduled (fourth media asset) is also negative, the system adjusts the schedule and inserts a mood booster with the media asset (e.g., pandas playing in a zoo) that has a positive response of +50. In some embodiments, the media asset delays sending the media asset 4 to the device until the cumulative mood score is increased. The system performs actions (e.g., inserting positive video, delaying delivery of negative video, etc.). After the user profile consumes the media boost, the cumulative mood score is −90 and the system may proceed to the original schedule. The system continues to evaluate the user's mood and recommend media assets that interest the user associated with the user profile while also maintaining the mood score associated with the user profile above a mood threshold. In some embodiments, when the content is being shared with additional users, the mood scores of the recipients may be determined before playing the content to ensure that the recipients' mood do not drop below a mood threshold.

Figure 5:
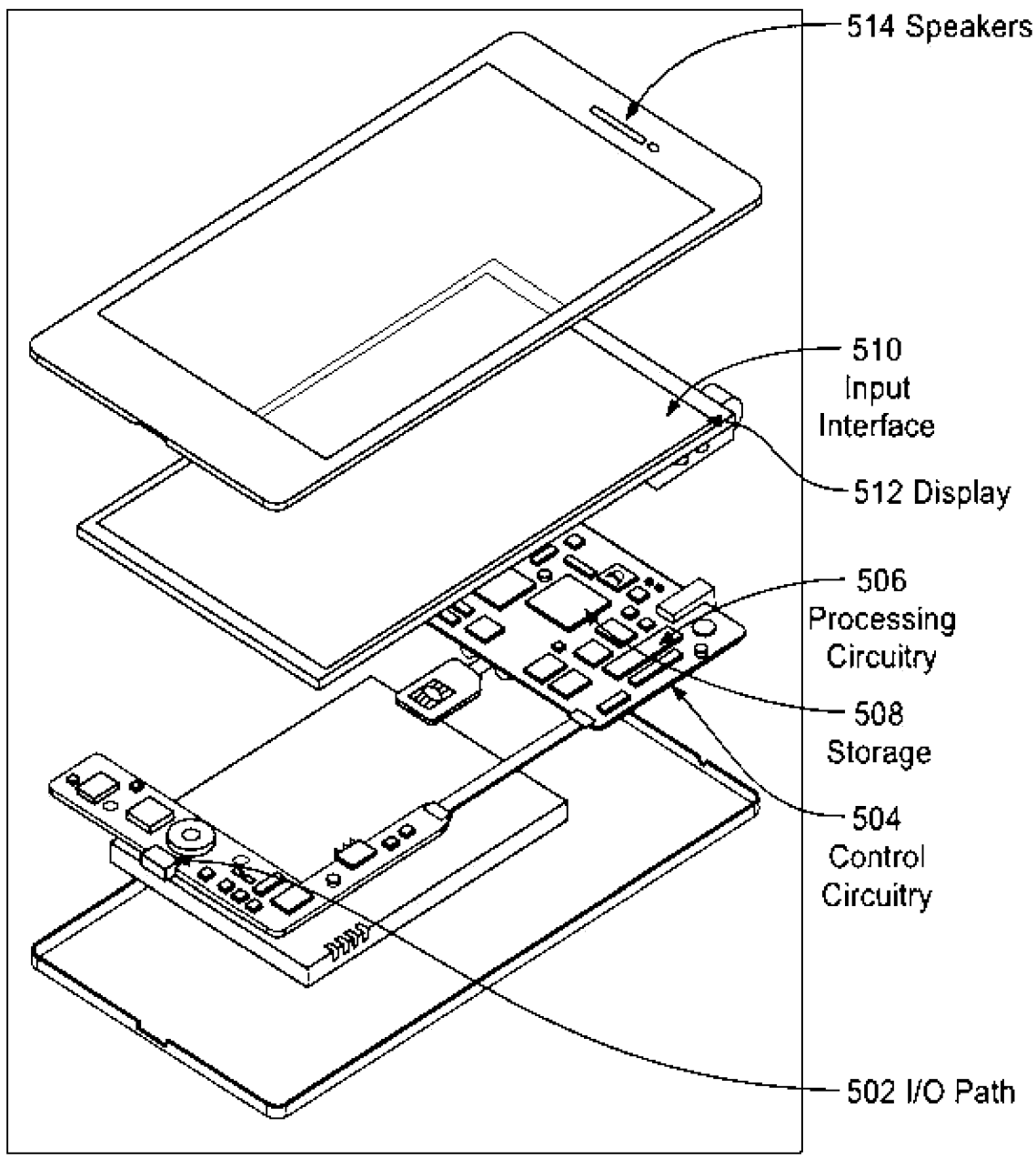
FIG. 5 is a block diagram of an illustrative device for curating media assets based on mood score associated with the media asset, in accordance with some embodiments of the disclosure.

In some embodiments, the methods and systems are described in connection with FIGS. 1-4 utilize a device on which to curate content. FIG. 5 is a block diagram of an illustrative device 500, in accordance with some embodiments of the present disclosure. As referred to herein, device 500 should be understood to mean any device that can curate content based on mood of the media asset and the mood of the consumer. As depicted, device 500 may be a smartphone, tablet or may additionally be a personal computer or television equipment. In some embodiments, device 500 may be an augmented reality (AR) or virtual reality (VR) headset, smart speakers, or any other device capable of outputting curated content.

Device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for causing to curate content based on signature analysis of the content. In one embodiment, content is media content. Some examples of media content include audio, video, text, AR, VR, etc.

An application on a device may be a stand-alone application implemented on a device or a server. The application may be implemented as software or a set of executable instructions. The instructions for performing any of the embodiments discussed herein of the application may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 5 the instructions may be stored in storage 508, and executed by control circuitry 504 of device 500.

In some embodiments, an application may be a client-server application where only the client application resides on device 500 (e.g., device 602), and a server application resides on an external server (e.g., server 606). For example, an application may be implemented partially as a client application on control circuitry 504 of device 500 and partially on server 606 as a server application running on control circuitry. Server 606 may be a part of a local area network with device 602, or may be part of a cloud computing environment accessed via the Internet. In a cloud computing environment, various types of computing services for performing searches on the Internet or informational databases, gathering information for a display (e.g., information for curating content for display), or parsing data are provided by a collection of network-accessible computing and storage resources (e.g., server 606), referred to as "the cloud." Device 500 may be cloud clients that rely on the cloud computing capabilities from server 606 to gather data to populate an application. When executed by control circuitry of server 606, the system may instruct the control circuitry to curate content on device 602. The client application may instruct control circuitry of the receiving device 602 to curate content for output. Alternatively, device 602 may perform all computations locally via control circuitry 504 without relying on server 606.

Control circuitry 504 may include communications circuitry suitable for communicating with a content server or other networks or servers. The instructions for carrying out the above-mentioned functionality may be stored and executed on server 606. Communications circuitry may include a cable modem, a wireless modem for communications with other equipment, or any other suitable communications circuitry. Such communications may involve the Internet or any other suitable communication network or paths. In addition, communications circuitry may include circuitry that enables peer-to-peer communication of devices, or communication of devices in locations remote from each other.

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, or any other suitable fixed or removable storage devices, and/or any combination of the same. Non-volatile memory may also be used (e.g., to launch a boot-up routine and other instructions). Cloud-based storage (e.g., on server 606) may be used to supplement storage 508 or instead of storage 508.

Control circuitry 504 may include display generating circuitry and tuning circuitry, such as one or more analog tuners, one or more MP3 decoders or other digital decoding circuitry, or any other suitable tuning or audio circuits or combinations of such circuits. Encoding circuitry (e.g., for converting over-the-air, analog, or digital signals to audio signals for storage) may also be provided. Control circuitry 504 may also include scaler circuitry for upconverting and downconverting content into the preferred output format of the device 500. Circuitry 504 may also include digital-to-analog converter circuitry and analog-to-digital converter circuitry for converting between digital and analog signals. The tuning and encoding circuitry may be used by the device to receive and to display, to play, or to record content. The tuning and encoding circuitry may also be used to receive guidance data. The circuitry described herein, including for example, the tuning, audio generating, encoding, decoding, encrypting, decrypting, scaler, and analog/digital circuitry, may be implemented using software running on one or more general purpose or specialized processors. Multiple tuners may be provided to handle simultaneous tuning functions. If storage 508 is provided as a separate device from device 500, the tuning and encoding circuitry (including multiple tuners) may be associated with storage 508.

A user may send instructions to control circuitry 504 using user input interface 510 of device 500. User input interface 510 may be any suitable user interface touchscreen, touchpad, stylus and may be responsive to external device add-ons such as a remote control, mouse, trackball, keypad, keyboard, joystick, voice recognition interface, or other user input interfaces. User input interface 510 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Speakers 514 may be provided as integrated with other elements of device 500 or may be stand-alone units. Display 512 may be used to display visual content, while audio content may be played through speakers 514. In some embodiments, the audio may be distributed to a receiver (not shown), which processes and outputs the audio via speakers 514.

Control circuitry 504 may allow a user to provide user profile information or may automatically compile user profile information. For example, control circuitry 504 may track user preferences for different content signatures and content curation. In some embodiments, control circuitry 504 monitors user inputs, such as queries, texts, calls, conversation audio, social media posts, etc., to detect user preferences. Control circuitry 504 may store the user preferences in the user profile. Additionally, control circuitry 504 may obtain all or part of other user profiles related to a particular user (e.g., via social media networks) and/or obtain information about the user from other sources that control circuitry 504 access. As a result, a user can be provided with personalized curated content while maintaining the mood above a preselected mood threshold.

Figure 6:
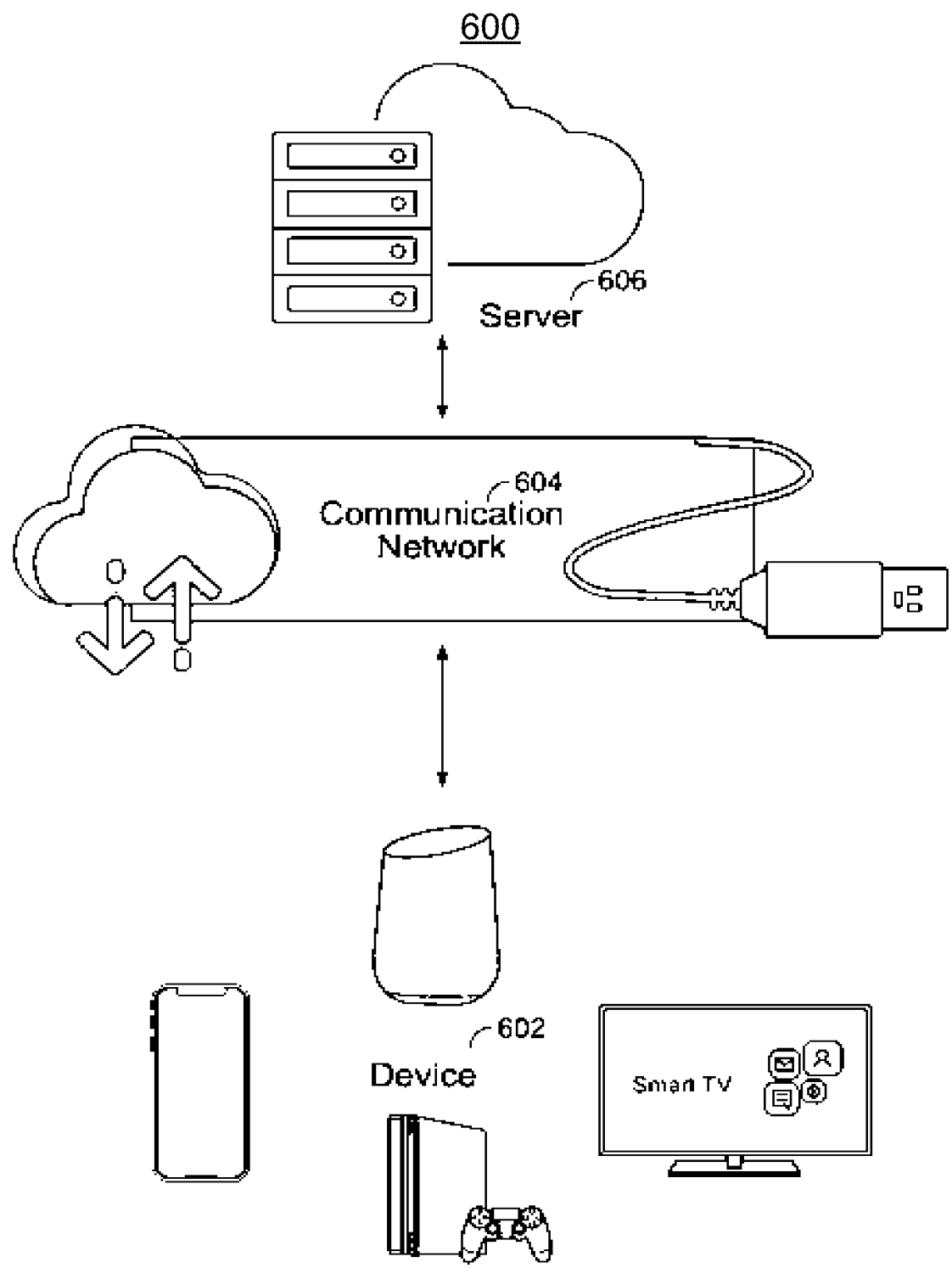
FIG. 6 is a block diagram of an illustrative system for curating media assets based on mood score associated with the media asset, in accordance with some embodiments of the disclosure.

Device 500 of FIG. 5 can be implemented in system 600 of FIG. 6 as device 602. Devices from which curated content may be output may function as a standalone device or may be part of a network of devices. Various network configurations of devices may be a smartphone or tablet, or may additionally be a personal computer or television equipment. In some embodiments, device 602 may be an augmented reality (AR) or virtual reality (VR) headset, smart speakers, or any other device capable of outputting curated content to a user based on the mood score of the media asset and the mood score associated with the consumer.

In system 600, there may be multiple devices but only one of each type is shown in FIG. 6 to avoid overcomplicating the drawing. In addition, each user may utilize more than one type of device and also more than one of each type of device.

As depicted in FIG. 6, device 602 may be coupled to communication network 604. Communication network 604 may be one or more networks including the Internet, a mobile phone network, mobile voice or data network (e.g., a 4G or LTE network), cable network, public switched telephone network, Bluetooth, or other types of communications network or combinations of communication network. Thus, device 602 may communicate with server 606 over communication network 604 via communications circuitry described above. In should be noted that there may be more than one server 606, but only one is shown in FIG. 6 to avoid overcomplicating the drawing. The arrows connecting the respective device(s) and server(s) represent communication paths, which may include a satellite path, a fiber-optic path, a cable path, a path that supports Internet communications (e.g., IPTV), free-space connections (e.g., for broadcast or other wireless signals), or any other suitable wired or wireless communications path or combination of such paths. Further details of the present disclosure are discussed below in connection with the flowcharts of FIGS. 7-9. It should be noted that the steps of processes 700, 800, and 900 of FIGS. 7-9, respectively, may be performed by control circuitry 504 of FIG. 5.

Figure 7:
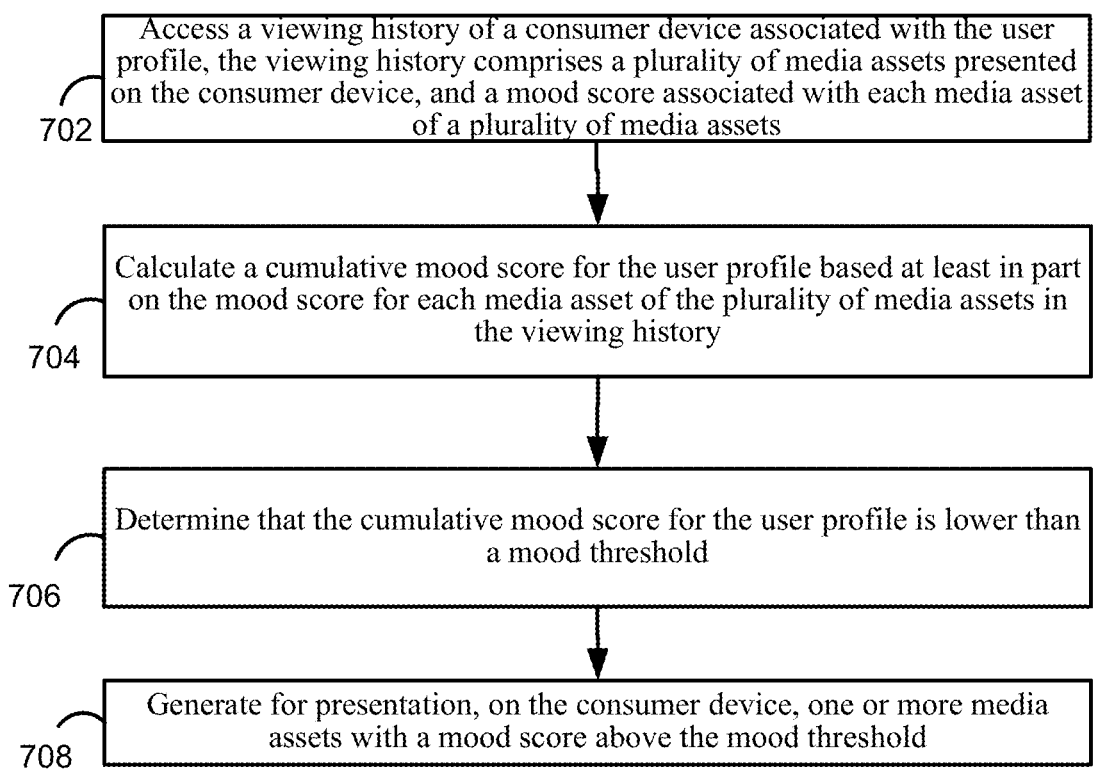
FIG. 7 depicts a flowchart of an illustrative process for curating media assets based on mood score associated with the media asset, in accordance with some embodiments of the disclosure.

FIG. 7 depicts a flowchart of an illustrative process 700 for recommending content based on a mood score associated with a user profile, in accordance with some embodiments of the disclosure. It should be noted that the steps of the process 700 can be performed by control circuitry 504 of FIG. 5. Control circuitry 504 may be part of a device having a display 512 (e.g., a device 500 that may have any or all of the functionalities discussed above with respect to FIG. 5), part of a remote server separated from the device by way of a communication network (e.g., communication network 604 of FIG. 6), or distributed over a combination of both.

At step 702, the control circuitry accesses a viewing history on a consumer device associated with the user. The viewing history may include a plurality of media assets presented on the consumer device and a mood score associated with each media asset. In some embodiments, the viewing history may be replaced with a viewing playlist that includes media assets that are scheduled to be played on the consumer device. Some examples of media asset include audio, video, text, AR, VR, etc. In one embodiment, the plurality of media assets are retrieved from a local network. In another embodiment, the plurality of content items are retrieved via a communication network (e.g., communication network 604 of FIG. 6). Each of the plurality of media assets includes a mood score that follows a predetermined consumption pattern such that the overall consumption mood score of the consumer does not drop below a mood threshold. The mood threshold may be an inputted value or a default value (e.g., −100, −150, etc.). The playlist includes a plurality of media assets having a mood score order. In one embodiment, at step 704, the control circuitry calculates a cumulative mood score for the user profile by adding the mood score for each media asset of the plurality of media assets in the viewing history above or as described in the playlist above in connection with step 206 of FIG. 2. In some embodiments, the control circuitry calculates the cumulative mood score for the user profile by subtracting mood score for media assets that were consumed a certain time gap apart. For example, for media assets that were consumer 1 hour prior to current content, the mood score may be subtracted for the user profile. At step 706, the control circuitry determines that the cumulative mood score for the user is lower than a mood threshold. The plurality of media asset machine learning models are used to identify media assets for inserting content into the presentation of the playlist to boost the consumer's mood and prevent it from dropping below a certain mood threshold.

At step 708, the control circuitry generates for presentation, on the consumer device, media assets with a mood score above the mood threshold to boost the consumer's mood. In some embodiments, step 708 generates the media assets with mood scores as described above in connection with mood score analysis step 150 of FIG. 1. In some embodiments, the control circuitry trains a media asset machine learning model based on the plurality of mood scores. In some embodiments, to increase the mood score quickly, the system may identify a media asset that includes a mood score that is greater than a second mood threshold. The second mood threshold may be a positive value or any value that is higher than the first mood threshold. For example, the system may search for media assets that have mood scores greater than +50 to increase the cumulative mood score of the user. In some embodiments, the control circuitry outputs the plurality of media asset machine learning models for generating one or more playlists. In one embodiment, the media asset machine learning models are outputted via a local network. In another embodiment, the media asset machine learning models are outputted via a communications network (e.g., communication network 604 of FIG. 6).

In some embodiments, the control circuitry calculates the cumulative mood score of the user based on capturing, via a sensor device, biometric data for the user; correlating the biometric data to a biometric mood score; and combining the biometric mood score and the mood score for each media asset of the plurality of media assets in the viewing history to determine the cumulative mood score of the user profile.

Figure 8:
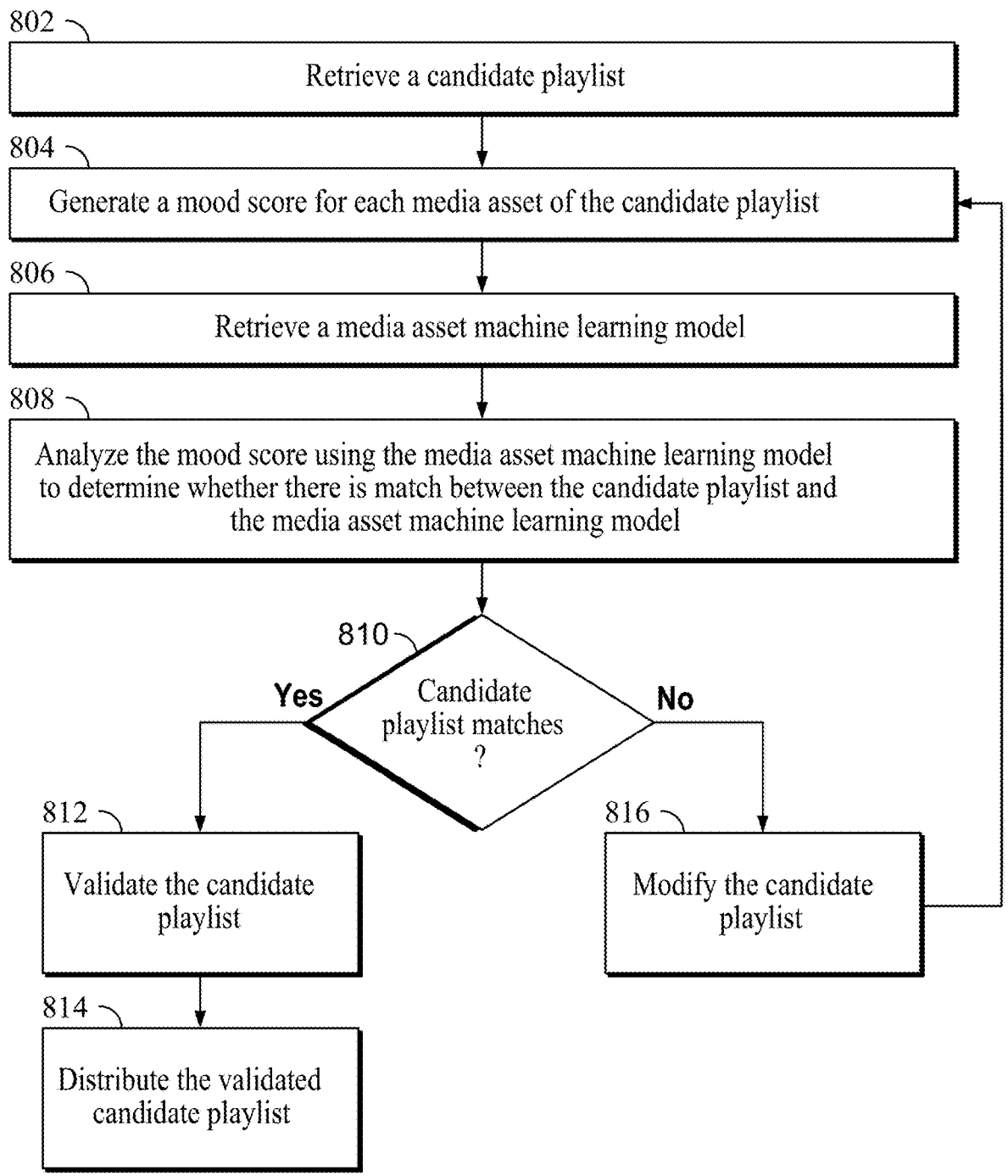
FIG. 8 depicts a flowchart of an illustrative process for validating the generated candidate playlist utilizing the generated media asset machine learning model, in accordance with some embodiments of the disclosure.

FIG. 8 depicts a flowchart of an illustrative process 800 for validating a generated candidate playlist utilizing the generated content machine learning model, in accordance with some embodiments of the disclosure. It should be noted that the steps of the process 800 can be performed by control circuitry 504 of FIG. 5. Control circuitry 504 may be part of a device having a display 512 (e.g., a device 500 that may have any or all of the functionalities discussed above with respect to FIG. 5), part of a remote server separated from the device by way of a communication network (e.g., communication network 604 of FIG. 6), or distributed over a combination of both.

At step 802, the control circuitry retrieves a candidate playlist (e.g., a playlist generated at step 708 of FIG. 7). In one embodiment, the candidate playlist is a media asset. Some examples of media content include audio, video, text, AR, VR, etc. As discussed above, the candidate playlist includes the identified candidate segments in a defined order. At step 804, the control circuitry generates a content mood score for each media asset of the candidate playlist. In one embodiment, step 804 is performed by media asset analyzer 304 of FIG. 3 as explained above. At step 806, the control circuitry retrieves a content machine learning model. At step 808, the control circuitry analyzes the mood score using the media asset machine learning model to determine whether there is a match between the candidate playlist and the media asset machine learning model. In some embodiments, step 808 is performed by machine learning model analyzer 306 of FIG. 3, as explained above. At step 810, the control circuitry determines whether the candidate playlist matches with the media machine learning model. If the control circuitry determines that the candidate playlist matches with the media asset machine learning model, then, at step 812, the control circuitry validates the candidate playlist. In one embodiment, the mood score of the candidate playlist may include characteristics such as positive media assets, neutral media assets and negative media assets similar to the media asset machine learning model. At step 814, the control circuitry distributes the validated candidate playlist. If the control circuitry determines that the candidate playlist does not match with the media asset machine learning model, then, at step 816, the control circuitry modifies the candidate playlist and repeats steps 804-810.

Figure 9:
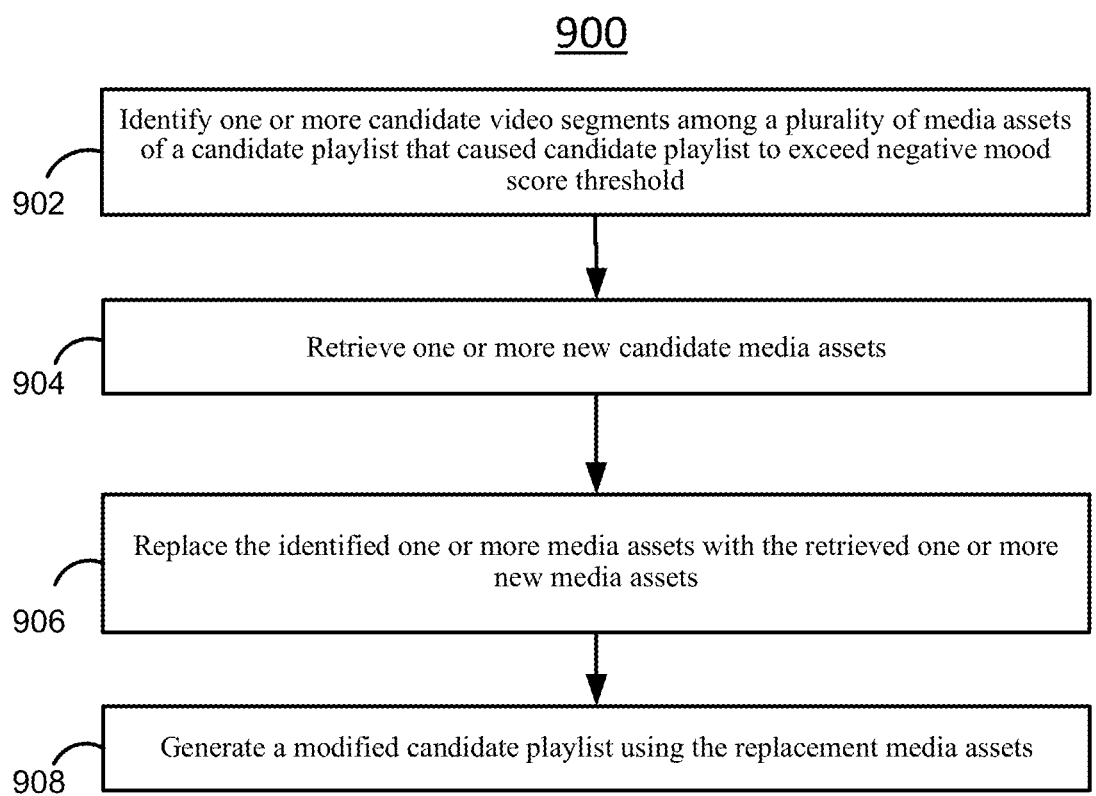
FIG. 9 depicts a flowchart of an illustrative process for modifying the generated candidate playlist, in accordance with some embodiments of the disclosure.

FIG. 9 depicts a flowchart of an illustrative process 900 for modifying the generated candidate playlist, in accordance with some embodiments of the disclosure. It should be noted that the steps of the process 900 can be performed by control circuitry 504 of FIG. 5. Control circuitry 504 may be part of a device having a display 512 (e.g., a device 500 that may have any or all of the functionalities discussed above with respect to FIG. 5), part of a remote server separated from the device by way of a communication network (e.g., communication network 604 of FIG. 6), or distributed over a combination of both.

At step 902, the control circuitry identifies one or more candidate media assets among the plurality of media assets of the candidate playlist that caused the candidate playlist to exceed the mood score threshold. In one embodiment, the candidate playlist is media content. Some examples of media content include audio, video, text, AR, VR, etc. In one embodiment, an output of a media asset machine learning model includes information indicating which media asset or media assets caused a candidate playlist to exceed the mood threshold mood. For example, multiple outputs may be used that indicate consistency between each pair of the adjacent media assets. When there is poor consistency between two adjacent media assets or they together produce a mood score that eclipses the mood threshold set by the consumer, one of the two media assets may be identified as causing the candidate playlist to not match and may be delayed for a later time. This way it does not lead to the user associated with the user profile being overly sad and stressed-out. At step 904, the control circuitry retrieves one or more new candidate media assets of the plurality of media assets with mood scores that are positive, to improve the consumer's mood. In one embodiment, playlist generator 130 of FIG. 1, using one or more appropriate media asset machine learning models, identifies the new one or more media assets. At step 906, the control circuitry replaces the identified one or more candidate media assets with the retrieved new one or more media assets. In some embodiments, the control circuitry rearranges the order of the playlist such that the identified one or more candidate media assets is presented at a later time, when the user's mood score is higher or not at risk of dropping below the threshold. At step 908, the control circuitry generates a modified candidate playlist using the replaced one or more media assets.

Figure 10:
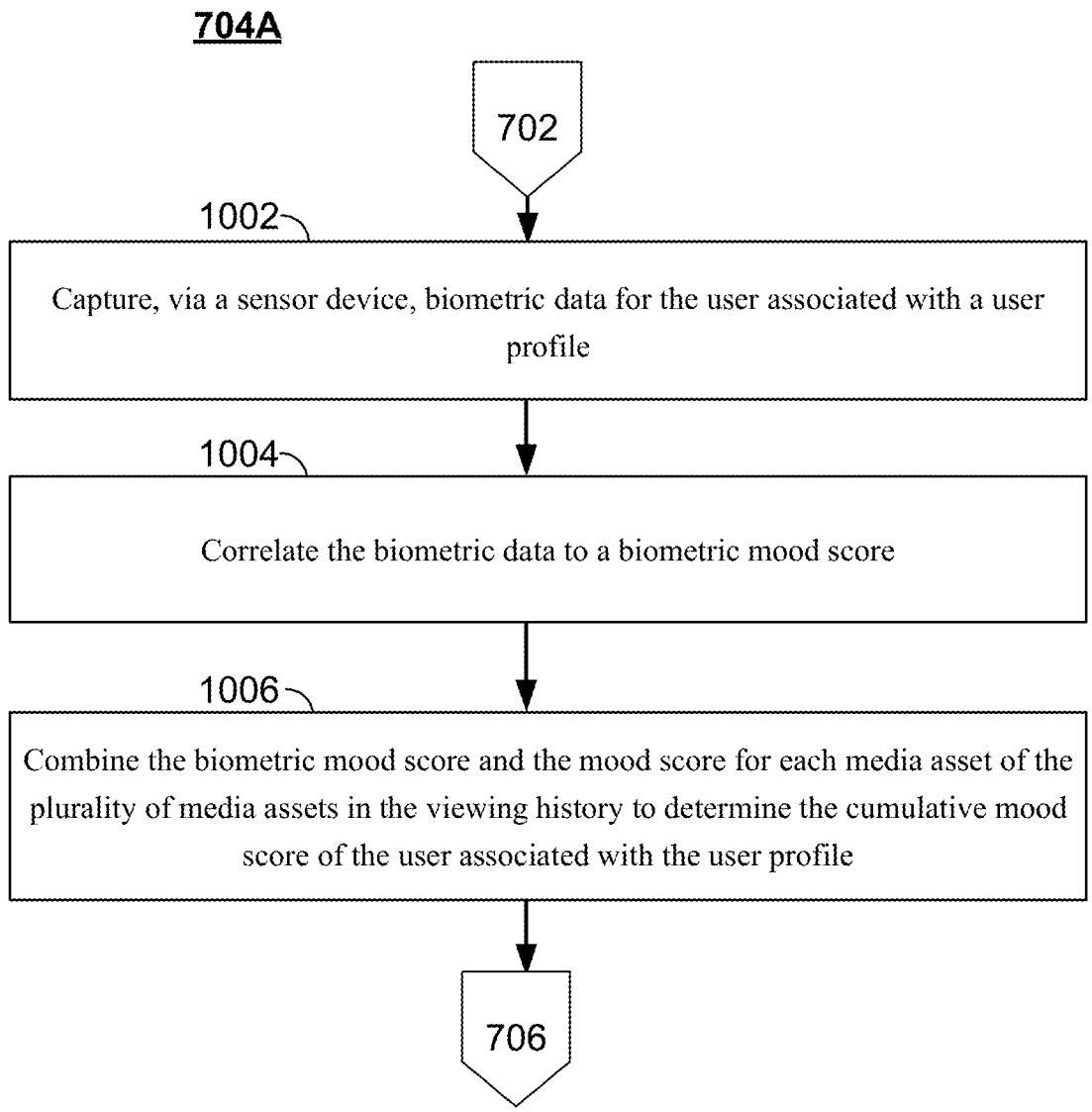
FIG. 10 depicts a flowchart of an illustrative process for calculating the cumulative mood score of the user profile, in accordance with some embodiments of the disclosure.

FIG. 10 is a flowchart of a detailed illustrative process for calculating the cumulative mood score of the consumer based on media assets and biometric data, in accordance with some embodiments of the disclosure. Process 704A is one embodiment of a method for performing step 704 of FIG. 7 and begins after step 702. At step 1002, a user device via sensors captures biometric data for the user. In some embodiments, the control circuitry 504 may communicate with the sensors to capture the biometric data. The captured data may include user preferences based on the content for each portion and user heart rate, breathing patterns, blood pressure and any other data a hand device may obtain. The control circuitry 504 may access a data structure and an interaction log for the consumer indicating which media assets the viewer consumed, both of which may be stored in a storage (e.g., storage 508). At step 1004, the control circuitry 504 correlates the biometric data to a biometric mood score. For example, based on elevated blood pressure, the device may determine that the user is stressed and assign a negative mood score. Similarly, if the user is calm, the control circuitry may remain neutral or assign a positive biometric score.

At step 1006, the control circuitry 504 combines the biometric mood score and the mood score for each media asset of the plurality of media assets in the viewing history to determine the cumulative mood score of the user profile. For example, the control circuitry 504 combines the mood score for each media asset the user profile consumed from the viewing history and the biometric mood score to identify the cumulative mood score. Process 704A then continues with step 706, in which the control circuitry determines if the cumulative mood score exceeds the mood threshold.

It is contemplated that the steps or descriptions of FIGS. 7-10 may be used with any other embodiment of this disclosure. In addition, the steps and descriptions are described in relation to FIGS. 7-10 may be done in alternative orders or in parallel to further the purposes of this disclosure. Any of these steps may also be skipped or omitted from the process. Furthermore, it should be noted that any of the devices or equipment discussed in relation to FIGS. 5-6 could be used to perform one or more of the steps in FIGS. 7-10.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real-time. It should also be noted that the systems and/or methods described above may be applied to, or used in accordance with, other systems and/or methods.

What is claimed is:

1. A method for recommending content based on a mood score associated with a user profile, the method comprising:
   accessing, from a memory database, a viewing history of a consumer device associated with the user profile, the viewing history comprising a plurality of media assets presented on the consumer device and a mood score associated with each media asset of the plurality of media assets;
   calculating, using a control circuitry, a cumulative mood score for the user profile based at least in part on the mood score for each media asset of the plurality of media assets in the viewing history;
   determining, using the control circuitry, that the cumulative mood score for the user profile is lower than a mood threshold; and
   in response to the cumulative mood score being lower than the mood threshold, generating for presentation, on the consumer device, one or more media assets with a positive mood score.

2. The method of claim 1, wherein the calculating the cumulative mood score for the user profile comprises:
   capturing, via a sensor device, biometric data for the user associated with the user profile;
   correlating the biometric data to a biometric mood score; and
   combining the biometric mood score and the mood score for each media asset of the plurality of media assets in the viewing history to determine the cumulative mood score of the user profile.

3. The method of claim 1, further comprising:
   forwarding, to the consumer device associated with the user profile, a media asset with a mood score below the mood threshold;
   determining that the cumulative mood score of the user profile is below the mood threshold; and
   in response to determining that the cumulative mood score of the user profile is below the mood threshold, delaying delivery of the media asset with the mood score below the mood threshold to the consumer device associated with the user profile.

4. The method of claim 3, wherein the delaying delivery of the media asset with the mood score below the mood threshold to the consumer device associated with the user profile comprises delaying delivery of the media asset until the cumulative mood score of the user profile is above the mood threshold.

5. The method of claim 1, wherein the calculating the cumulative mood score for the user profile is based on a predetermined period.

6. The method of claim 1, wherein the calculating the cumulative mood score for the user profile is based on a latest content presentation session.

7. The method of claim 1, wherein the mood threshold is a first mood threshold; wherein generating for presentation, on the consumer device, the media assets with the positive mood score comprises generating for presentation media assets with a mood score above a second mood threshold, wherein the second mood threshold is higher than the first mood threshold.

8. The method of claim 1, wherein the generating for presentation, on the consumer device, the media assets with a positive mood score comprises:
   identifying based on the viewing history of the user profile a common context of the media assets presented for consumption; and
   in response to identifying the common context of the media assets, generating for presentation, on the consumer device, the media assets with a mood score above the first mood threshold and a context different from the identified common context.

9. The method of claim 1, wherein the mood threshold is a first mood threshold;
   the method further comprising:
   in response to the calculating, comparing the cumulative mood score to a second mood threshold; and
   in response to the cumulative mood score being above the second mood threshold, recommending a supplemental media asset.

10. The method of claim 1, further comprising:
    receiving, at the consumer device, a selection of a mood indicator of the media asset, the mood indicator comprising at least one of an emoji, a comment, a mood input value or biometric data; and
    correlating, by the control circuitry, the mood indicator to a mood score for each media asset.

11. A system for recommending content based on a mood score associated with a user profile, the system comprising:
    a memory configured to store information from the user profile;
    a control circuitry configured to:
    access a viewing history of a consumer device associated with the user profile, the viewing history comprises a plurality of media assets presented on the consumer device, and a mood score associated with each media asset of the plurality of media assets;
    calculate a cumulative mood score for the user profile based at least in part on the mood score for each media asset of the plurality of media assets in the viewing history;
    determine that the cumulative mood score for the user profile is lower than a mood threshold; and
    in response to the cumulative mood score being lower than the mood threshold, generate for presentation, on the consumer device, one or more media assets with a positive mood score.

12. The system of claim 11, wherein the control circuitry is further configured to calculate the cumulative mood score for the user profile by:
- capturing via a sensor device, biometric data for the user associated with the user profile;
- correlating the biometric data to a biometric mood score; and
- combining the biometric mood score and the mood score for each media asset of the plurality of media assets in the viewing history to determine the cumulative mood score of the user profile.

13. The system of claim 11, wherein the control circuitry is further configured to:
- forward, to a consumer device associated with the user profile, a media asset with a mood score below the mood threshold;
- determine that the cumulative mood score of the user profile is below the mood threshold; and
- in response to determining that the cumulative mood score of the user profile is below the mood threshold, delay delivery of the media asset with the mood score below the mood threshold to the consumer device associated with the user profile.

14. The system of claim 13, wherein the control circuitry is configured to delay delivery of the media asset with the mood score below the mood threshold to the consumer device associated with the user profile by delaying delivery of the media asset until the cumulative mood score of the user profile is above the mood threshold.

15. The system of claim 11, wherein the calculating the cumulative mood score for the user profile is based on a predetermined period.

16. The system of claim 11, wherein the calculating the cumulative mood score for the user profile is based on a latest content presentation session.

17. The system of claim 11, wherein the mood threshold is a first mood threshold, and wherein the control circuitry is further configured to generate for presentation, on the consumer device, the media assets with the positive mood score by generating for presentation media assets with a mood score above a second mood threshold, wherein the second mood threshold is higher than the first mood threshold.

18. The system of claim 11 wherein the control circuitry is further configured to generate for presentation, on the consumer device, the media assets with a positive mood score by:
- identifying based on the viewing history of the user profile a common context of the media assets presented for consumption; and
- in response to identifying the common context of the media assets, generating for presentation, on the consumer device, the media assets with a mood score above the first mood threshold and a context different from the identified common context.

19. The system of claim 11, wherein the mood threshold is a first mood threshold, and wherein the control circuitry is further configured to:
- in response to the calculating, compare the cumulative mood score to a second mood threshold; and
- in response to the cumulative mood score being above the second mood threshold, recommend a supplemental media asset.

20. The system of claim 11, wherein the control circuitry is further configured to:
- receive, at the consumer device, a selection of a mood indicator of the media asset, the mood indicator comprises at least one of an emoji, comment, a mood input value or biometric data; and
- correlate the mood indicator to a mood score for each media asset.

* * * * *